(12) United States Patent
Weng et al.

(10) Patent No.: US 6,239,995 B1
(45) Date of Patent: May 29, 2001

(54) RESONANT-BOOST-INPUT THREE-PHASE POWER FACTOR CORRECTOR WITH A LOW CURRENT STRESS ON SWITCHES

(75) Inventors: Da Feng Weng, Yorktown Heights, NY (US); Subbaraya Yuvarajan, Fargo, ND (US)

(73) Assignee: NDSU Research Foundation, Fargo, ND (US)

( * ) Notice: Subject to any disclaimer, the term of this patent is extended or adjusted under 35 U.S.C. 154(b) by 0 days.

(21) Appl. No.: 09/522,534

(22) Filed: Mar. 10, 2000

Related U.S. Application Data

(60) Provisional application No. 60/123,879, filed on Mar. 11, 1999.

(51) Int. Cl.[7] .................................................. H02M 5/42
(52) U.S. Cl. ............................. 363/89; 363/37; 363/44
(58) Field of Search .......................... 363/34, 37, 39, 363/40, 41, 44, 1, 48, 123, 132, 89; 315/209, 219, 291, 297, 307

(56) References Cited

U.S. PATENT DOCUMENTS

| 4,564,897 | * | 1/1986 | Okamoto et al. ................ 363/132 |
|---|---|---|---|
| 4,729,081 | | 3/1988 | Nilssen ............................. 363/17 |
| 4,949,016 | * | 8/1990 | De bijl et al. .................... 315/208 |
| 5,038,267 | | 8/1991 | De Doncker et al. ............ 363/89 |
| 5,404,082 | * | 4/1995 | Hernandez et al. .............. 315/219 |
| 5,414,613 | | 5/1995 | Chen ................................. 363/52 |
| 5,510,974 | | 4/1996 | Gu et al. .......................... 363/134 |
| 5,587,892 | | 12/1996 | Barrett ............................. 363/44 |
| 5,598,326 | | 1/1997 | Liu et al. ......................... 363/34 |
| 5,625,543 | | 4/1997 | Barrett ............................. 363/44 |
| 5,627,455 | | 5/1997 | Jacobs et al. .................... 323/222 |
| 5,633,793 | | 5/1997 | Lee et al. ......................... 363/127 |
| 5,668,707 | | 9/1997 | Barrett ............................. 363/44 |
| 5,731,969 | | 3/1998 | Small ............................... 363/126 |
| 5,737,205 | | 4/1998 | Pouliquen et al. ............... 363/96 |
| 5,773,955 | | 6/1998 | Hall ................................. 320/21 |
| 5,790,389 | | 8/1998 | Hua ................................. 363/20 |
| 5,804,951 | | 9/1998 | Rivet ............................... 323/223 |
| 5,815,386 | | 9/1998 | Gordon ............................ 363/50 |
| 5,847,548 | | 12/1998 | He et al. .......................... 323/220 |
| 6,026,006 | * | 2/2000 | Jiang et al. ...................... 363/132 |
| 6,034,489 | * | 3/2000 | Weng ............................... 315/307 |

* cited by examiner

*Primary Examiner*—Peter S. Wong
*Assistant Examiner*—Gary L. Laxton
(74) *Attorney, Agent, or Firm*—Dorsey & Whitney LLP (57) ABSTRACT

A three phase AC-DC power conversion circuit is provided. The circuit includes a plurality of input inductors and capacitors and output capacitors. A high frequency current source is operably connected between the input and output of the circuit and operates to transfer energy from the input capacitors to the output capacitors. The energy is transferred through the secondary of a transformer in the high frequency current source. Current in the high frequency current source's switches flows through the primary of the transformer.

10 Claims, 8 Drawing Sheets

FIG. 1

PRIOR ART

RESONANT-BOOST-INPUT THREE-PHASE POWER FACTOR CORRECTOR WITH A LOW CURRENT STRESS ON SWITCHES

This applications claims the priority of prior provisional application Ser. No. 60/123,879 filed Mar. 11, 1999, which is incorporated herein by reference.

I. FIELD OF THE INVENTION

The present invention relates generally to power converters. More particularly, the invention relates to methods and apparatus for reducing the stress on power converter switches and reducing conduction and switching losses in power converters.

II. BACKGROUND OF THE INVENTION

Various topologies of power converting circuits are known in the art. Generally, in a power converting circuit, the input of the circuit is coupled to a power source (such as a battery or 3-phase AC source) and the output of the circuit is coupled to an electrical load to which the power provided by the power converting circuit is to be delivered.

Three phase AC-DC power converters are used to supply large amounts of power, while maintaining balanced operation of the three AC phase mains. In many of these three-phase circuits, one or more active semiconductor switching devices ("switches"), such as MOSFETS, JFETS, IGBTS, and thyristors, are coupled between the input and output of the power converting circuit. These switching devices are configured and selectively controlled (in a manner well known in the art) to switch on and off in such a way as to condition the power received from the AC power source for delivery to the electrical load—i.e., to provide power factor correction (PFC).

Several topologies and control methods for AC-DC power conversion have been developed during the past years. At least two types of topologies are available that provide low-cost, high-efficiency power conversion with simple control. The first topology may be referred to as the Single Switch Boost-type three phase PFC ("SSB converter"). A typical SSB converter uses a single switch, that is switched in zero current switching (ZCS) condition, to provide power factor correction. Such a topology is discussed in the publication entitled "An Active Power Factor Correction Technique For Three-Phase Diode Rectifiers" authored by A. R. Prasad, P. D. Ziogas, and S. Manias, IEEE PESC 1989, pp. 58–66.

Figure 1:
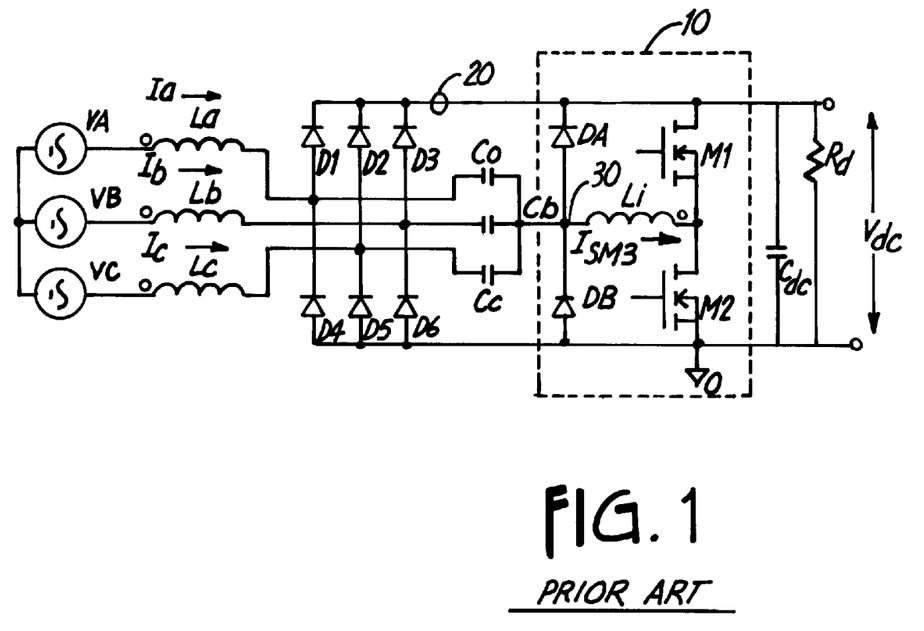
FIG. 1 is a schematic diagram of a prior art Resonant Boost Input three-phase PFC circuit.

The second topology is the Resonant Boost Input three-phase PFC ("RBI converter"). This topology is discussed in the publication entitled "Resonant Boost Input Three Phase Power Factor Corrector" authored by Da Feng Weng and Subbaraya Yuvarajan, IEEE APEC 1998 Record, pp. 958–62, and is hereby incorporated by reference in its entirety. A schematic diagram of this topology is shown in FIG. 1. The RBI converter works in zero voltage switching (ZVS) soft switching condition which allows the converter to work at higher switching frequencies. In this circuit, the equivalent duty-cycle of the boost inductor automatically varies with the input phase voltage. Thus, for a given value of total harmonic distortion (THD), the output DC bus 20 voltage can be relatively low and very close to the peak line voltage.

In the circuit of FIG. 1, components $L_a$, $L_b$, $L_c$, $C_a$, $C_b$, $C_c$ and $D_1$–$D_6$ form a three-phase input resonant network. The switches $M_1$ and $M_2$, along with diodes $D_a$ and $D_b$, and inductor $L_1$ are configured such that these components comprise a high frequency current source 10. This high frequency current source 10 operates to transfer energy stored in the input capacitors $C_a$, $C_b$, and $C_c$ (corresponding to each of the AC voltage input phases) to the output capacitor $C_{dc}$ (across which the desired load is connected). The capacity of the circuit to transfer energy will have an effect on the input power of the converter. In other words, this circuit may be used to control the input power and shape the waveform of the input current. This input waveform shaping function is described immediately below.

The input current waveform (i.e., the input current's magnitude, power and total harmonic distortion) provided by each of the AC voltage source input phases $V_a$, $V_b$, and $V_c$ is controlled by the variable excitation time for the corresponding input inductors $L_a$, $L_b$, and $L_c$. For example, the input current waveform for current $I_a$ is controlled by changing the excitation time for input inductor $L_a$. The excitation time for a particular input inductor is, in turn, controlled by changing the difference in the initial and final voltages on the corresponding input capacitors $C_a$, $C_b$, and $C_c$ during each switching cycle. (Note that the final voltage across an input capacitor during each switching cycle will be the final DC output voltage $V_{dc}$ and the initial voltage across the input capacitor may be as low as zero.) Clearly, the longer the time taken by the input capacitor to change from the initial to the final voltage during a switching cycle, the greater the excitation time for the input inductors. The time required by the input capacitors for charging from the initial to the final voltage may, in turn, be controlled by the input line current. Thus, it is clear that when the instantaneous amplitude of the input current is low, the time required for charging from the initial to the final voltage across the input capacitors will be relatively long, and when the instantaneous amplitude of the input current is high, the time for charging from the initial to the final voltage will be relatively short.

During each switching period, the energy supplied to the input capacitors $C_a$, $C_b$, and $C_c$ by the input currents must be released or transferred to the output of the converter, otherwise the capacitors $C_a$, $C_b$, $C_c$ cannot absorb any of the input power. In the converter, the high frequency current source 10 is used to transfer the energy stored in $C_a$, $C_b$, $C_c$ to the output of the converter.

The process of energy transfer by the high frequency current source can be divided into two stages. During the first stage, the energy in $C_a$, $C_b$ and $C_c$ is transferred to the high frequency inductor $L_1$. During the second stage, the energy in $L_1$ is transferred to the output of the converter through the active switches $M_1$ and $M_2$. Because the energy stored in $C_a$, $C_b$, $C_c$ is transferred to the output of the converter through $L_1$, the current in $L_1$ must be relatively high to store the total energy of $C_a$, $C_b$ and $C_c$. As shown in FIG. 1, the current in $L_1$ also passes through active switches $M_1$ and $M_2$. The amplitude of the current will affect the conduction loss of the active switches $M_1$ and $M_2$. In the second stage, as the active switches $M_1$ and $M_2$ alternately turn on or off, the energy in $L_1$ will be released to the output through the body diode (not shown) of $M_1$ or $M_2$ and diode $D_a$ or $D_b$. The turn-off current of the active switches $M_1$ and $M_2$ will be the maximum value of the current in $L_1$. The amplitude of the current will also affect the switching loss of $M_1$ and $M_2$.

During each switching period, the discharge time of $C_a$, $C_b$, and $C_c$ should be less than half of the switching period in order to guarantee that $C_a$, $C_b$, and $C_c$ will be charged from zero again. For a given the value of (1) $C_a(=C_b=C_c)$, (2) the switching frequency ($f_s$), (3) the rated input power, and (4) the output voltage $V_{dc}$, the minimum amplitude $I_{SM}$ of the high-frequency current source required to transfer the energy can be expressed as:

$$I_{SM}=8 f_s C_a V_{dc} \quad (1)$$

The relation between the product $f_s$ $C_a$ and the input power level is obtained as $$f_s C_a = F/R_{equ} \quad (2)$$

where F is a coefficient and $R_{equ}$ is the equivalent resistance seen by the capacitor $C_a$. From (2), it is clear that the product of $f_s$ $C_a$ varies linearly with the input RMS current. From equations (1) and (2), it can be concluded that, as the power level of the converter increases, the amplitude of the high-frequency current source 10 also has to be increased to guarantee the required input power and a sufficiently low THD in the three-phase input current.

The topology just described has several advantages over the previously mentioned SSB converter topology. This RBI converter topology, unlike the SSB converter topology, operates in zero voltage switching (ZVS) condition and thus can handle higher switching frequencies than the SSB converter. Additionally, much lower DC bus 20 voltages are possible for a given AC input voltage and given acceptable level of total harmonic distortion. However, this RBI converter topology has one disadvantage as compared to the SSB converter. In the RBI converter, the current stress on the switches is almost double that of the SSB converter. Increased switch current stress leads to undesirable conduction losses and turn-off switching losses. Thus, there is a need for an AC-DC power converter that has all the advantages of the RBI type converter while having a switch current stress approximately the same as an SSB converter.

III. SUMMARY

A three phase AC-DC power conversion circuit is provided. The circuit includes a plurality of input inductors and capacitors and output capacitors. A high frequency current source is operably connected between the input and output of the circuit and operates to transfer energy from the input capacitors to the output capacitors. The energy is transferred through the secondary of a transformer in the high frequency current source. Current in the high frequency current source's switches flows through the primary of the transformer.

V. DETAILED DESCRIPTION

A. Description of a First Embodiment

1. Structure of the First Embodiment

Figure 2:
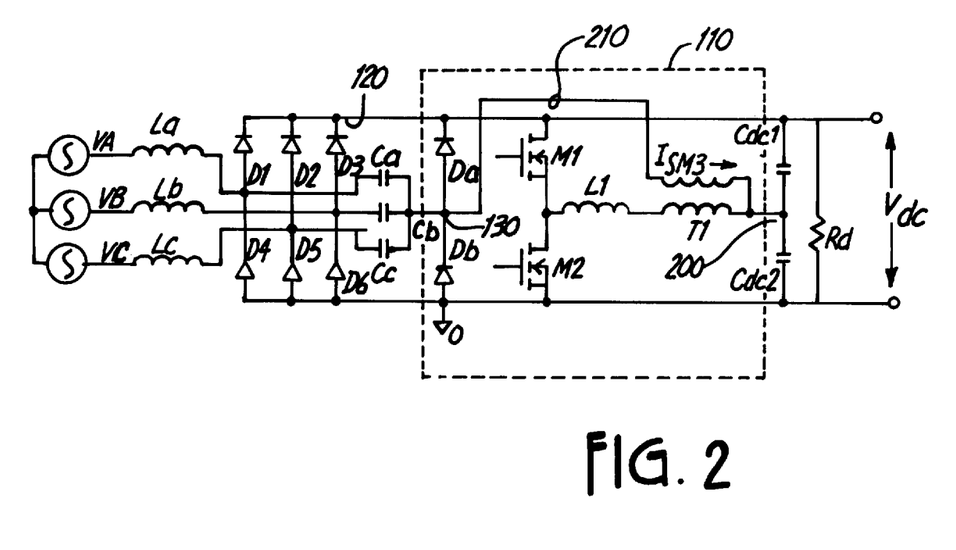
FIG. 2 is a schematic diagram of a Resonant Boost Input three-phase PFC circuit according to one embodiment of the present invention.

In one embodiment of the present invention shown in FIG. 2, some of the general configuration of the power converter topology of FIG. 1 has been retained. However, novel structural changes have been made in the present invention to achieve its objectives—retaining the advantages that the power converter of FIG. 1 has over SSB converters, while reducing the current stress on the switches $M_1$ and $M_2$. One of the key points of the invention is that the amount of energy transferred by the high frequency current source 110 is reduced in comparison to the circuit of FIG. 1. This is accomplished in the present invention by directly transferring the energy stored in $C_a$, $C_b$, and $C_c$ to the output of the converter through the current transformer $T_1$.

Referring specifically now to FIGS. 1 and 2, the novel structural changes of the present invention are discussed. First, it can be seen in FIG. 2 that the output DC voltage is now supplied by two series coupled output capacitors $C_{dc1}$ and $C_{dc2}$ (as opposed to the single output capacitor $C_{dc}$ of FIG. 1). Second, a current transformer $T_1$ has been added to the high frequency current source 110 of FIG. 2. Third, the connections of some of the components of the high frequency current source 110 of FIG. 2 have been changed in comparison to FIG. 1.

With regard to the second and third of these structural changes, the common terminal 30 of the input capacitors $C_a$, $C_b$, and $C_c$ of FIG. 1 is no longer connected to the switches $M_1$ and $M_2$ through the inductor $L_1$. Rather, as shown in FIG. 2, the common terminal 130 of the input capacitors $C_a$, $C_b$, and $C_c$ is now connected to the terminal 200 between the output capacitors $C_{dc1}$ and $C_{dc2}$ via the secondary of current transformer $T_1$. Additionally, as shown in FIG. 2, the primary of the transformer $T_1$ is connected at one end to the transformer $T_1$ secondary and at the other end to inductor $L_1$. Inductor $L_1$ is, in turn, connected to the terminal between switches $M_1$ and $M_2$. With these changes in mind, a more detailed description of one embodiment of the present invention is now provided.

The circuit of FIG. 2 is composed of three input inductors $L_a$, $L_b$, $L_c$; six ultra-fast diodes $D_1$–$D_6$; one high-frequency inductor $L_1$; one high-frequency current transformer $T_1$; two general-purpose diodes $D_a$, $D_b$; three input capacitors $C_a$, $C_b$, $C_c$; two output or DC bulk capacitors $C_{dc1}$, $C_{dc2}$; and two power switches $M_1$, $M_2$. In the circuit of FIG. 2, the section comprising $D_a$, $D_b$, $M_1$, $M_2$, $T_1$, and $L_1$ constitutes a high-frequency current source 110. The current source 110 discharges the capacitors $C_a$, $C_b$, and $C_c$ and transfers the energy stored in $C_a$, $C_b$, and $C_c$ to the DC bulk capacitors $C_{dc1}$ and $C_{dc2}$ and the load which is across the DC bus 120. As noted above, the circuit of FIG. 2 uses a current transformer $T_1$ as part of high frequency current source 110. Since the circuit can operate at a relatively high switching frequency, the size of the transformer $T_1$ can be small.

2. Operation of the First Embodiment a. Operation in General

In operation, the configuration of FIG. 2 operates to reduce the current stress (i.e., the maximum current flowing through) on switches $M_1$ and $M_2$ by a desired amount. Generally, the amount of current flowing through switch $M_1$ (or $M_2$, depending upon which switch is on), inductor $L_1$, and the transformer $T_1$ primary may be controlled by the current transformer ratio.

The transformer $T_1$ secondary provides an alternative current path 210 for the high frequency current source 110 current $I_{SM}$ (The magnitude of this current and other variables may be determined from the same equations described above in the Background of the Invention). This current (which in FIG. 1 would flow through inductor $L_1$ and the "on" switch $M_1$ or $M_2$ to the load) now bypasses the switches $M_1$ and $M_2$ altogether via alternative current path 210. Now the current flowing through the switches $M_1$ or $M_2$ and inductor $L_1$ is proportionally lower than the current $I_{SM}$, depending upon the current ratio of current transformer $T_1$. It can be seen that this reduced current through the switches $M_1$ and $M_2$ reduces current stress, reduces conduction and turn-off switching losses through the switches $M_1$ and $M_2$, and generally increases the efficiency of the power converter. Moreover, the charging current of the two output capacitors $C_{dc1}$ and $C_{dc2}$ is also reduced proportionally, thereby prolonging the active life of these components.

b. Operation in More Detail

Figure 3:
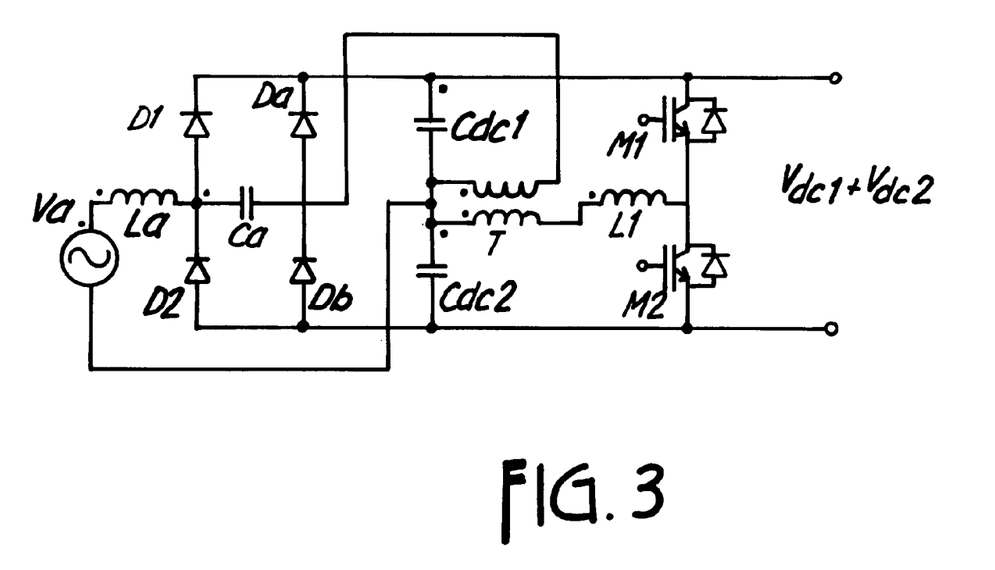
FIG. 3 is a schematic diagram of the equivalent single-phase circuit for the embodiment of the present invention illustrated in FIG. 2.

A more detailed description of the operation of the power converter of FIG. 2 is now provided. The power converter can be decoupled into three single-phase PFC converters as shown in FIG. 3, each of which is a single-phase doubler PFC converter. In FIG. 3, with the help of the current transformer $T_1$, the input capacitor $C_a$ transfers whole or part of the input energy to the DC bulk capacitors $C_{dc1}$, $C_{dc2}$, and the load. The whole switching process can be divided into a resonant input mode and a boost input mode.

i. Resonant Input Mode

The resonant input mode corresponds to a low input voltage and the voltage on $C_a$ is always less than $(V_{dc1}+V_{dc2})$. The energy from the input line is first stored on $C_a$ and then transferred to the output through resonance. During the resonant input mode, each half-cycle can be further divided into six switching modes discussed immediately below:

Mode 1: The switch $M_2$ is turned on. Assuming that the current in the transformer $T_1$ secondary is larger than the current in the differential choke $L_a$, the diode $D_b$ turns on, the transformer $T_1$ releases the energy in inductor $L_1$ to $C_{dc2}$, and the current in $L_1$ resonantly decreases. The input capacitor $C_a$ is charged by $V_a(V_{in})$ through $L_a$. The voltage across $C_a$ increases but it will be less than $(V_{dc1}+V_{dc2})$.

Mode 2: Once the switch $M_2$ is turned off, the current through $L_1$ continues through $D_1$ and switch $M_1$ is turned on under ZVS condition. The energy stored in $L_1$ is released to the DC capacitors $C_{dc1}$ and $C_{dc2}$ through the current transformer $T_1$, $D_b$, and $D_1$. The current in $L_1$ will decrease to zero causing $D_b$ to turn off.

Mode 3: The capacitor $C_a$ with its initial voltage resonates with $L_1$ through the current transformer $T_1$, and the resonant current flows through $D_1$, $C_{dc1}$, $L_1$, and $M_1$. The energy stored in $C_a$ is transferred directly to $C_{dc1}$ or through $L_1$, and the energy stored in $L_a$ is released to $V_{dc1}$ through $D_1$.

Mode 4: As the voltage on $C_a$ drops below zero, $D_a$ is turned on. The voltage on $C_a$ is clamped to zero and the transformer $T_1$ releases the energy in inductor $L_1$ to $C_{dc1}$, and thus the current in $L_1$ resonantly decreases. The energy stored in $L_a$ continues to be released to $V_{dc1}$ through $D_1$.

Mode 5: As the switch $M_1$ turns off, the switch $M_2$ can be turned on under ZVS condition. The energy stored in $L_1$ will be released to $C_{dc2}$ through the current transformer $T_1$ and $D_2$. The current in $L_1$ will decrease to zero, and then $D_a$ is turned off. The energy stored in $L_a$ continues to be released to $V_{dc1}$ through $D_1$.

Mode 6: The switch $M_2$ is turned on. The capacitor $C_a$ will resonate with $L_1$ through the current transformer $T_1$, and the current through $L_1$ increases. As the current through $L_1$ exceeds the input current, $D_1$ will be turned off and $D_b$ will turn on and carry the current of the secondary of $T_1$. The energy in $L_1$ will be released to $C_{dc2}$. The switching process will then return to Mode 1.

ii. Boost Input Mode

The boost input mode corresponds to a high value of instantaneous input line-voltage and the voltage on $C_a$ will reach $(V_{dc1}+V_{dc2})$. The input capacitor $C_a$ transfers part of the input energy to the output and the differential choke $L_a$ and the switch ($M_1$ or $M_2$ at various times) feeds part of the input energy to the output directly through boost function. During this mode, each half-cycle can be divided into seven switching modes discussed immediately below:

Mode 1: The switch $M_2$ is turned on. Assuming that the current in the secondary of transformer $T_1$ is larger than the current in the differential choke $L_a$, the diode $D_b$ turns on, the transformer $T_1$ release the energy in inductor $L_1$ to $C_{dc2}$, and the current in $L_1$ resonantly decreases. The input capacitor $C_a$ is charged by $V_a(V_{in})$ through $L_a$. The voltage on $C_a$ increases until it reaches $(V_{dc1}+V_{dc2})$.

Mode 2: Once the voltage on $C_a$ exceeds $(V_{dc1}+V_{dc2})$, $D_1$ will be turned on and the energy stored in $L_a$ will be released to $V_{dc1}$. The transformer $T_1$ releases the energy in inductor $L_1$ to $C_{dc2}$, and the current in $L_1$ resonantly decreases..

Mode 3: Once the switch $M_2$ is turned off, the current through $L_1$ continues through $D_1$ and switch $M_1$ is turned on under ZVS condition. The energy stored in $L_1$ is released to the DC capacitors $C_{dc1}$ and $C_{dc2}$ through the current transformer $T_1$, $D_b$, and $D_1$. The current in $L_1$ will decrease to zero causing $D_b$ to turn off.

Mode 4: The capacitor $C_a$ with its initial voltage $(V_{dc1}+V_{dc2})$ resonates with $L_1$ through the current transformer $T_1$, and the resonant current flows through $D_1$, $C_{dc1}$, $L_1$, and $M_1$. The energy stored in $C_a$ is transferred directly to $C_{dc1}$ or through $L_1$, and the energy stored in $L_a$ is released to $V_{dc1}$ through $D_1$.

Mode 5: As the voltage on $C_a$ drops below zero, $D_a$ is turned on. The voltage on $C_a$ is clamped to zero and the transformer $T_1$ releases the energy in inductor $L_1$ to $C_{dc1}$, and the current in $L_1$ resonantly decreases. The energy stored in $L_a$ continues to be released to $V_{dc1}$ through $D_1$.

Mode 6: As the switch $M_1$ turns off, the switch $M_2$ can be turned on under ZVS condition. The energy stored in $L_1$ will be released $C_{dc2}$ through the current transformer $T_1$ and $D_2$. The current in $L_1$ will decrease to zero, and then $D_a$ is turned off. The energy stored in $L_a$ continues to be released to $V_{dc1}$ through $D_1$.

Mode 7: The switch $M_2$ is turned on. The capacitor $C_a$ will resonate with $L_1$ through the current transformer $T_1$, and the current through $L_1$ increases. As the current through $L_1$ exceeds the input current, $D_1$ will be turned off and $D_b$ will turn on and carry the current of the secondary of $T_1$. The energy in $L_1$ will be released to $C_{dc2}$. The switching process will then return to Mode 1.

It is clear that during each mode, the input capacitor $C_a$ can directly transfer the energy stored to the $C_{dc1}$ or $C_{dc2}$ through the current transformer $T_1$, and the inductor $L_1$ will also help the energy transfer from the capacitor $C_a$ to $C_{dc1}$ or $C_{dc2}$. The inductor $L_1$ will be not used to store energy temporarily. It is the direct energy transfer that makes the efficiency of the whole system high.

c. Specific Example of the First Embodiment

A power converter according to the first embodiment of the present invention has been simulated. The simulation was performed with AC voltage sources having a frequency of 600 Hz in order to reduce the simulation time. (Typical applications of the present invention would involve the use of AC sources having frequencies of 50 Hz, 60 Hz, and 400 Hz.) The various components of the converter were given the following values: $L_a=L_b=L_c=1.72$ MH, $C_a=C_b=C_c+5.1$ nF, $C_{dc1}=C_{dc2}=200$ uF, $L_1=200$ uH, and switching frequency $f_s=170$ kHz. Diodes $D_1$ through $D_6$ are ultra-fast diodes and diodes $D_a$ and $D_b$ are general purpose diodes. The transformer $T_1$ is a 2:1 current transformer. For an input voltage of 208 Vrms line, the final output voltage $V_{dc}=(V_{dc1}+V_{dc2})$ was chosen as 340 Vdc.

Figure 4A:
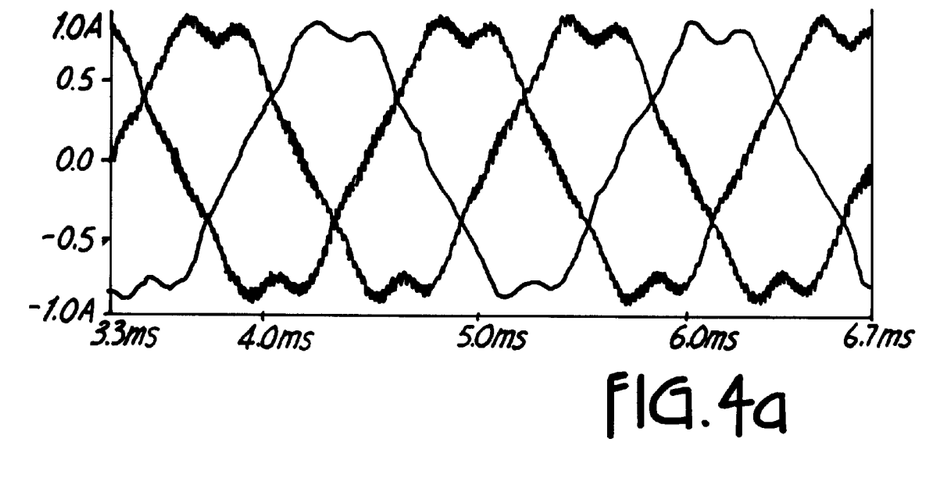
FIGS. 4(a) and (b) illustrate the input current waveforms and the frequency spectrum of one of the phase currents of the circuit of FIG. 2.
Figure 4B:
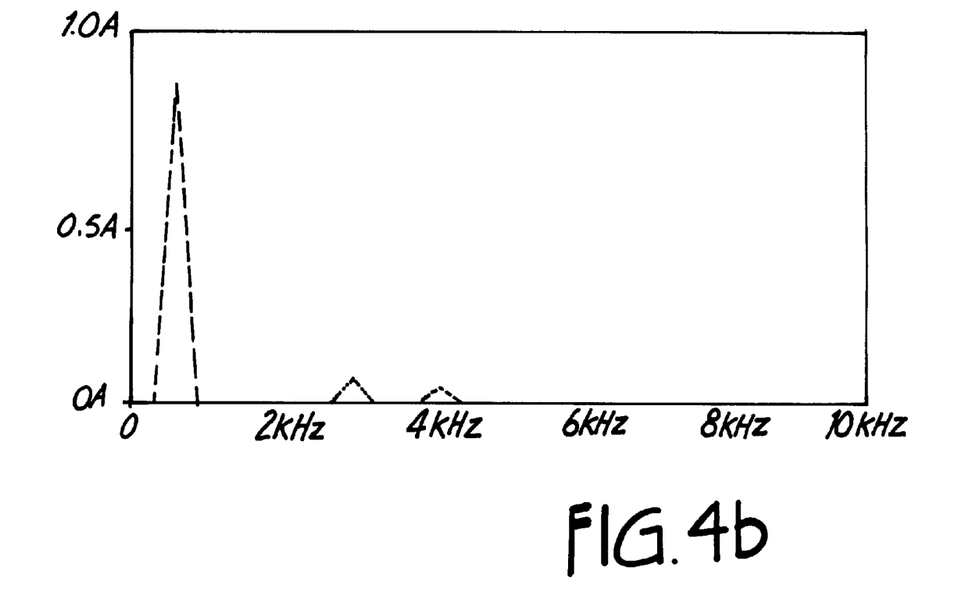

In FIGS. 4(a) and (b), there is shown the waveforms of the AC input current and the frequency spectrum of one of the phase currents, respectively. As may be calculated from FIG. 4(a), the value of THD is approximately 8.5%.

Figure 5A:
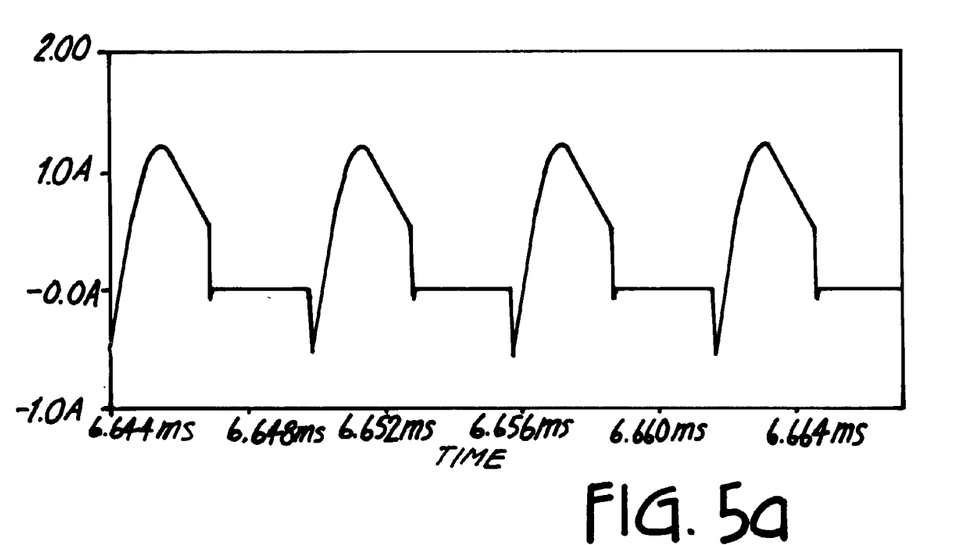
FIGS. 5(a) and (b) illustrate the switch current waveforms for the circuits of FIGS. 2 and 1, respectively.
Figure 5B:
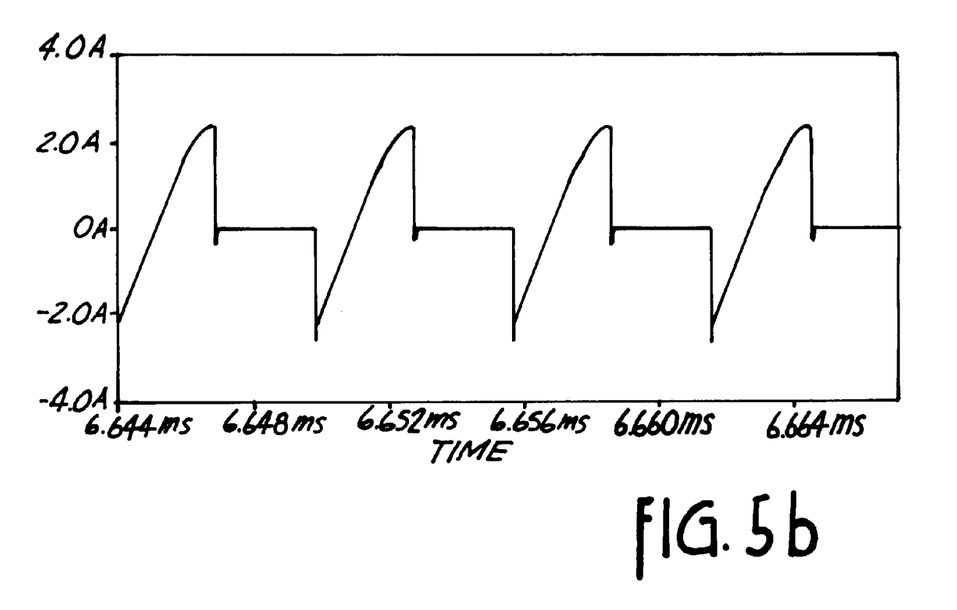

In FIG. 5(a) there is shown the current waveform of switch $M_1$ of the present invention and in FIG. 5(b), for comparison, the current waveform of switch $M_1$ for the converter of FIG. 1. From these Figures, it can be seen that the peak current through $M_1$ for an input power of 214 W in the present invention (FIG. 2) is 1.21A. In comparison, the prior art converter of FIG. 1 has a current stress of 2.40A for an input power of 189W. Thus, the current stress is reduced by 50% in the proposed converter.

B. Description of a Second Embodiment

Figure 6:
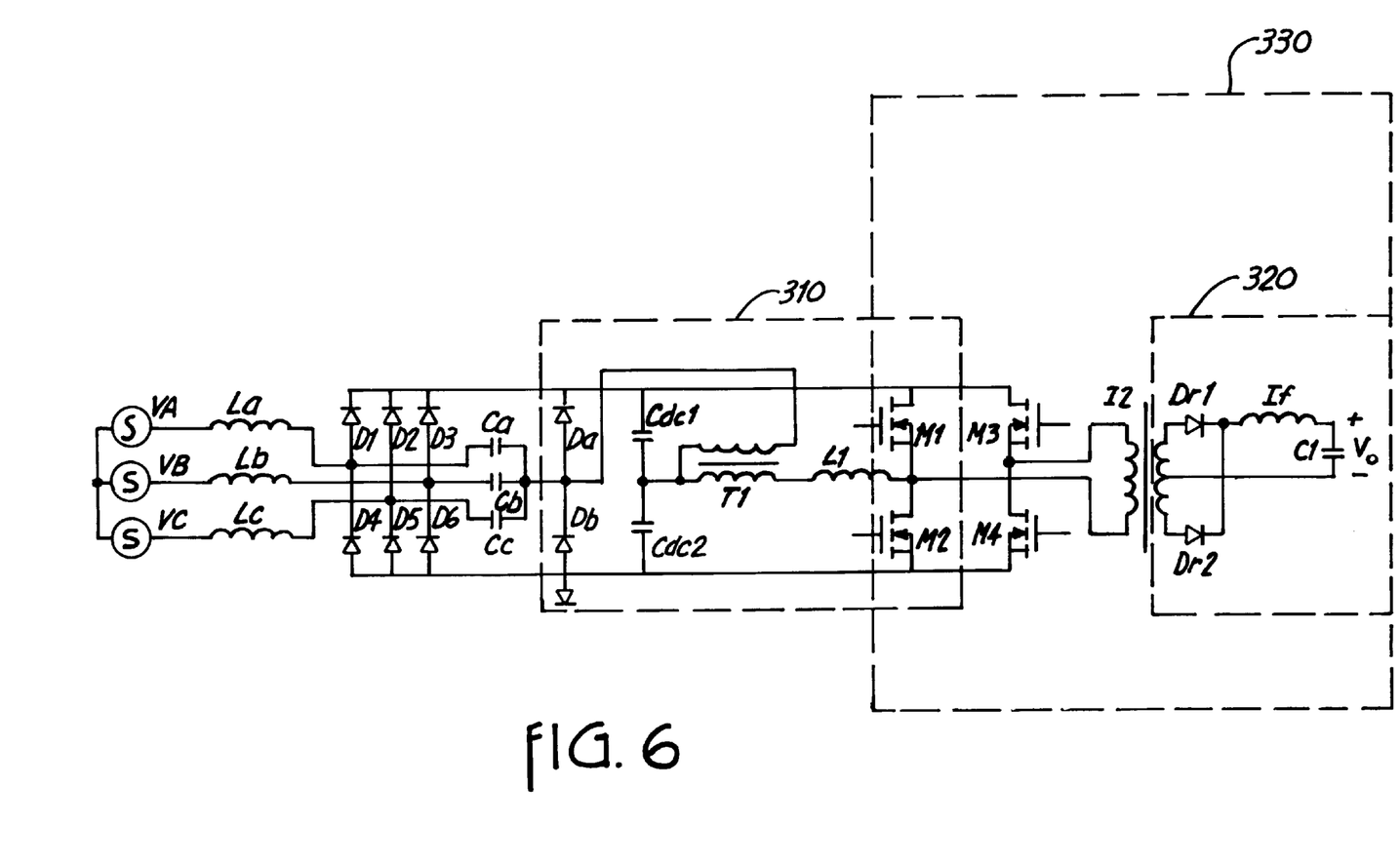
FIG. 6 is a schematic diagram of a second embodiment of the present invention.

A second embodiment of the present invention is shown in FIG. 6. This embodiment of the present invention adds a phase shift controlled DC-DC voltage converter 330 to the power converter circuit of FIG. 2 which, in turn, provides the circuit with another control variable for controlling the output power.

In this embodiment, the high-frequency current source 310 still comprises components $D_a$, $D_b$, $M_1$, $M_2$, $T_1$, and $L_1$. The high-frequency current source 310 discharges the input capacitors $C_a$, $C_b$, $C_c$ and transfers the energy stored in them to the DC bulk capacitors $C_{dc1}$ and $C_{dc2}$ and the load which is across the DC bus. However, in this embodiment, a second pair of switches $M_3$ and $M_4$, a second transformer T2, and a rectifier and filter circuit 320 have been added to the circuit of FIG. 2. These latter components, together with switches $M_1$ and $M_2$, comprise a full-bridge DC-DC converter 330 which is phase-shift controlled. In this full-bridge converter 330, the lagging-leg switches $M_1$ and $M_2$ perform both the PFC function and the DC-DC conversion function. The leading-leg switches $M_3$ and $M_4$ perform the DC-DC conversion function only.

The output power of the full-bridge DC-DC 330 converter is controlled by varying its equivalent duty cycle and is independent of the switching frequency. Thus, in the circuit of FIG. 6, two independent control variables are available: (1) the switching frequency which is used to control the input power and (2) the equivalent duty cycle which is used to control the output power. Since these control variables are independent, it is possible to balance the input power and the output power, thereby setting the DC link voltage. In general, in a full-bridge, phase-shift dc-dc converter, the switches in the leading leg ($M_3$, $M_4$) turn on and turn off under ZVS condition automatically due to the load current. However, the switches in the lagging leg ($M_1$, $M_2$) do not have ZVS unless an auxiliary circuit is added. In the converter of the second embodiment, the ZVS of the switches in the lagging leg is automatically provided by the high-frequency current source. More over, the circuit allows operation over a wide load range with ZVS and a higher efficiency.

C. Description of a Third Embodiment

Figure 7:
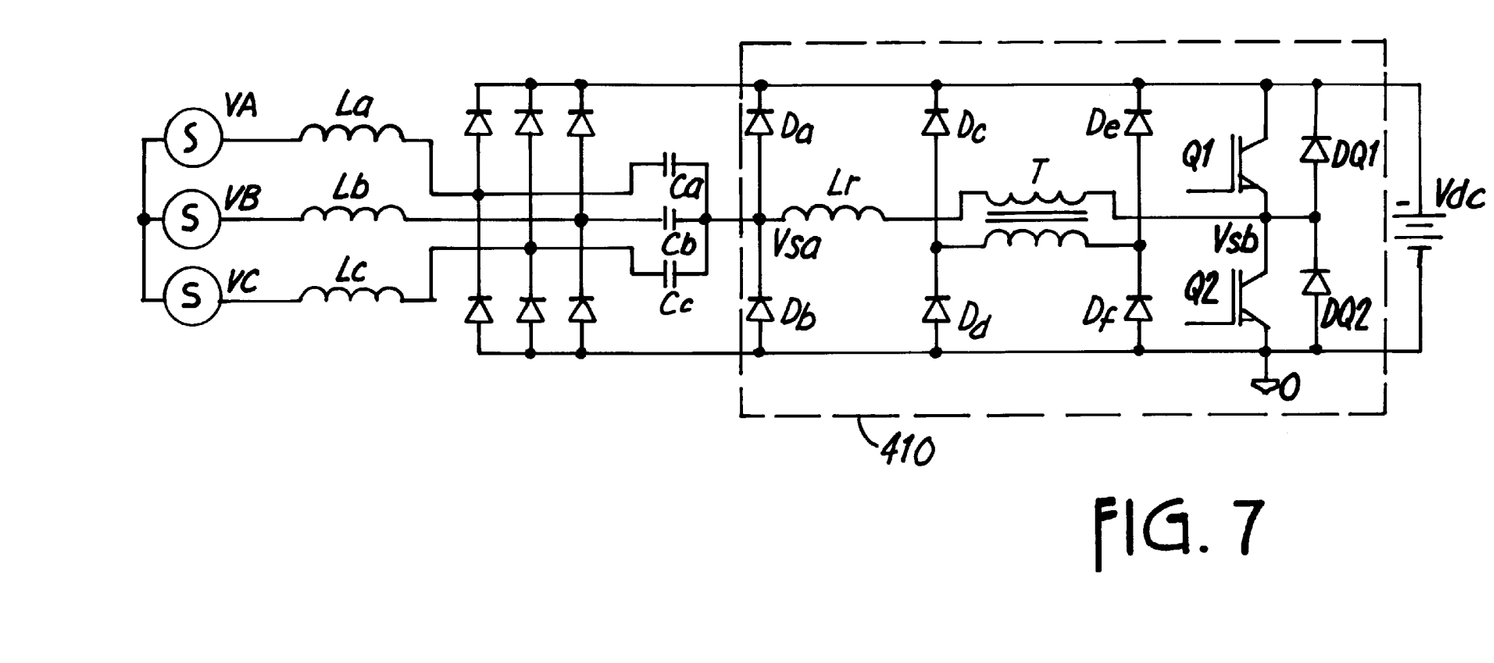
FIG. 7 is the schematic diagram of a third embodiment of the present invention.

The circuit of a third embodiment of the present invention is shown in FIG. 7. In the circuit of FIG. 7, the section comprising $D_a$–$D_f$, $Q_1$, $Q_2$, T, and $L_r$ constitutes a high-frequency resonant pulse current source 410 which discharges the capacitors $C_a$, $C_b$, and $C_c$ and transfers the energy stored in them to the DC bulk capacitor $C_{dc}$ and the load (shown in FIG. 7 as voltage source $V_{dc}$). Like the circuit of FIG. 2, this circuit can operate at a higher switching frequency and the size of the transformer can be small. In comparison to the circuit of FIG. 1, the circuit of FIG. 7 uses a voltage transformer with a ratio n:1 to feed the energy stored in $C_a$, $C_b$, and $C_c$ back to the DC bus and to eliminate circulating currents. The operation of this circuit is described below.

As $Q_1$ turns on under ZCS due to the current in $L_r$ going to zero, the inductor $L_r$ resonates with $C_a$, $C_b$, and $C_c$. The DC bus voltage is reflected as an AC voltage source through the voltage transformer T to absorb the stored energy in the capacitors. As the voltage on $C_a$, $C_b$, and $C_c$ goes to zero or $V_{dc}$ ($V_{sa}$ reaches $V_{dc}$), the current in $L_r$ reaches its maximum value. After that, the current in $L_r$ decays to zero and the energy in $L_r$ is released to the dc bus through the transformer. After the current in $L_r$ drops to zero with $Q_1$ still conducting, the voltage across $C_a$, $C_b$, and $C_c$ will stay at zero or $V_{dc}$ until the next half switching-period. Because the current in $Q_1$ is equal to the current through $L_r$ which is almost zero, $Q_1$ turns off in ZCS with a negligible switching loss. A similar sequence of operation occurs when $Q_2$ turns on under ZCS. In FIG. 7, the freewheeling diodes $DQ_1$ and $DQ_2$ are used to clamp the voltage of $Q_1$ and $Q_2$.

It can be shown that the time taken for the energy stored in $C_a$, $C_b$, and Cc to be transferred to the DC bus is much shorter for the circuit of FIG. 1. Hence the power density and the corresponding power loss will be higher in the circuit of FIG. 1. On the other hand, the circuit of FIG. 7 has a lower power density and a lower power loss which means a higher overall efficiency.

The circuit parameters are determined by the required input power, the switching frequency $f_s$, and the output dc voltage $V_{dc}$. The maximum charge $Q_c$ on $C_a$ can be expressed as $$Q_c = 3 \cdot C_a \cdot V_{dc}$$

The amplitude of the resonant current $I_m$ is then given by $$I_m = 2 \cdot Q_c \cdot f_s$$

From the value of $I_m$ and those of $C_a$, $C_b$, and $C_c$, the value of $L_r$ can be determined. The input power varies almost linearly with the switching frequency $f_s$. In order to guarantee ZCS condition for $Q_1$ and $Q_2$, the maximum switching frequency has to be limited.

Figure 8:
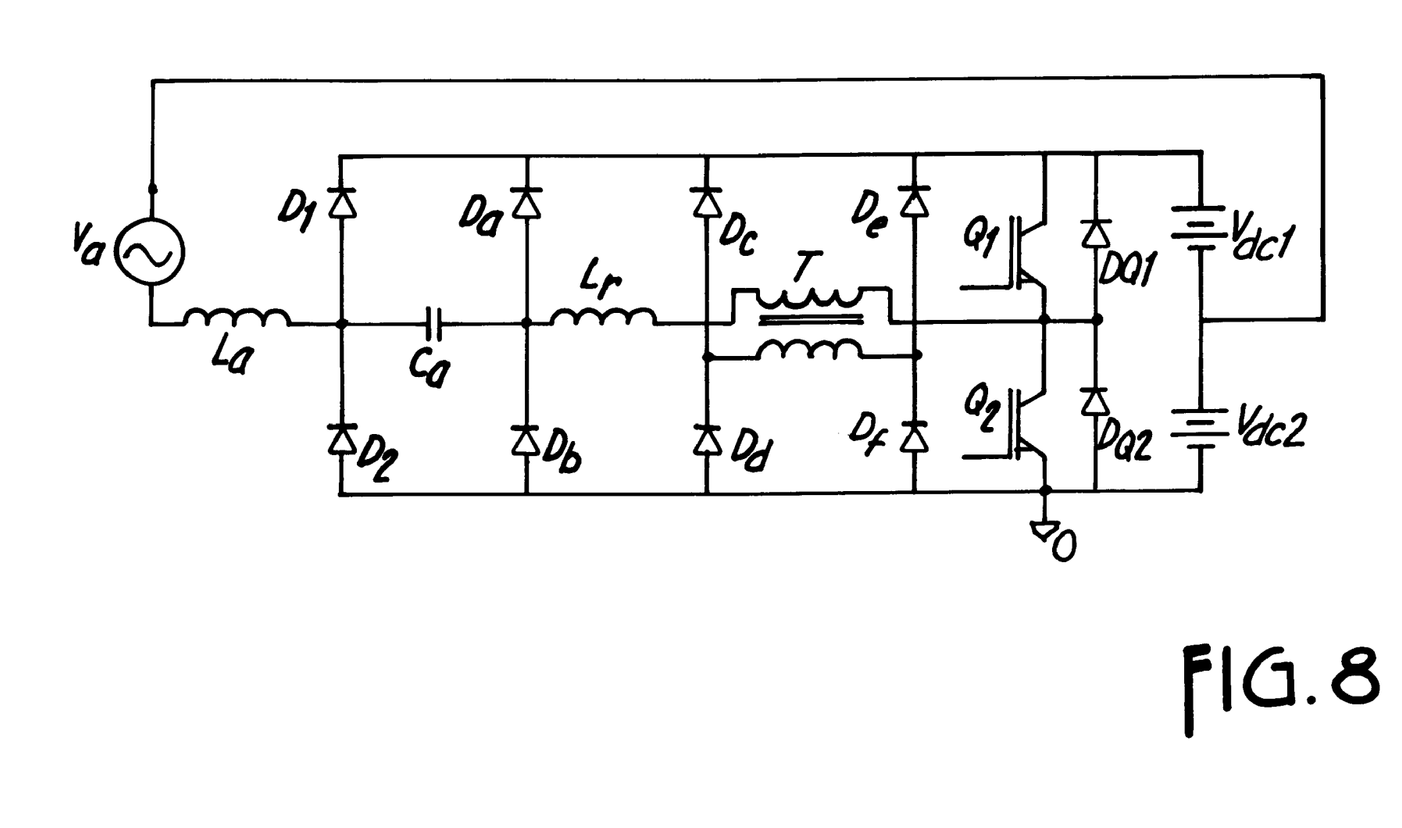
FIG. 8 is a schematic diagram of the equivalent single-phase circuit for the embodiment of the present invention illustrated in FIG. 7.

For a balanced three-phase system, the converter of FIG. 7 can be decoupled into three single-phase PFC converters as shown below FIG. 8. Each of the converters is a single-phase doubler PFC converter. The input capacitor $C_a$ transfers part of the input energy to the inductor $L_1$ and the energy is then transferred to the DC bulk capacitor and the load. As with the first embodiment of the present invention, the whole switching process can be divided into a resonant input mode and a boost input mode.

1. Resonant Input Mode

The resonant input mode corresponds to a low input voltage and the voltage on $C_a$ is always less than $(V_{dc1}+V_{dc2})$. During this mode, each half-cycle can be divided into six switching modes. The energy from the input line is first stored on $C_a$ and then transferred to the output by the high-frequency current source. During each switching period, $C_a$ is charged from zero to a certain value and then discharged to zero. After that, the voltage across $C_a$ is kept at zero until the next half-switching period 2. Boost Input Mode During the boost input mode, the instantaneous input line-voltage is high, and the voltage on $C_a$ will reach $(V_{dc1}+V_{dc2})$. During this mode, each half-cycle can be divided into seven switching modes. The input capacitor $C_a$ transfers part of the input energy to the output and the input inductor $L_a$ and the diodes $D_1$ or $D_2$ feeds part of the input energy to the output directly through a boost function. During each switching period, the voltage on $C_a$ is charged from zero to $(V_{dc1}+V_{dc2})$ and then discharged to zero and after that, the voltage on $C_a$ is kept at zero until the next half switching-period.

During each mode of operation, the input capacitor $C_a$ automatically controls the equivalent duty-cycle and thus plays a key role in shaping the input current. The capacitor $C_a$ will be charged from zero to a certain value or $(V_{dc1}+V_{dc2})$, and then discharged to zero completely by the high-frequency current source. There will be a circulating current through the switches and diodes $D_a$ or $D_b$ with zero energy stored in $C_a$. After that, the voltage on $C_a$ is kept at zero until the next half switching-period. If the high-frequency current source goes to zero and stays there after the voltage on $C_a$ decays to zero, there will be no circulating current and the voltage on $C_a$ will stay at zero. This suggests that if the high-frequency current source has three levels, namely, $+I_m$, 0, and $-I_m$, where $I_m$ is its amplitude, then there will be no circulating current and the efficiency will be high. Since the three-level current source has a zero current period, the ZCS condition for the IGBTs is automatically set up.

3. Remarks on the Third Embodiment

An IGBT switch is a particularly good choice for this embodiment since it has conductivity modulation in device structure and an on-voltage which is independent of the current density. Due to the recombination of the minority carriers in the wide base region of the integral BJT, this recombination process produces what is frequently termed as the "current tail." This current tail limits the operating frequency of the IGBT. A good turn-off method is to make the IGBT turn-off in ZCS, that is, the current in IGBT is first decreased to almost zero and then the gate drive voltage reduced to zero. In this case, the minority carriers are first swept out of the wide base region of the integral BJT and the turn-off energy is very low.

In this embodiment, the time taken for the energy stored in the input capacitors $C_a$, $C_b$, $C_c$ to be transferred to the DC bus is relatively shorter than in the embodiment of FIG. 2. Thus, in this embodiment, there is a period in which the current in $L_r$ decays to zero and the energy in $L_r$ has been released to DC bus through the voltage transformer. After the current $L_r$ reduces to zero and IGBT1 or IGBT2 is still on, $C_a$, $C_b$, and $C_c$ will have a zero voltage or $V_{dc}$ until the next half switching period. Because the current in IGBT1 or IGBT2 is equal to the current in $L_r$ which is almost zero, as IGBT1 or IGBT2 turns off in ZCS, the switching loss in IGBT1 or IGBT2 will be almost zero. The embodiment allows that the invention can be applied in higher power level applications.

VI. CONCLUDING REMARKS

This application incorporates by reference all materials in related provisional application Ser. No. 60/123,879 filed on Mar. 11, 1999.

It will be readily apparent to those skilled in the art that innumerable variations, modifications, applications, and extensions of these embodiments and principles can be made without departing from the principles and spirit of the invention. For example, one skilled in the art will realize that the number of switches and other components may be increased without detracting from the advantages of the present invention. Accordingly, it is intended that the scope of the invention be only limited as necessitated by the accompanying claims.

What is claimed is:

1. A power conversion circuit, comprising:
   a three phase input resonant network; and
   a current source for transferring energy from the three phase input resonant network to a load, comprising:
   switching circuitry for conditioning the transferred energy; and
   a transformer;
   wherein the secondary of the transformer provides an alternate current path for the current source current by bypassing the switching circuitry.

2. The power conversion circuit of claim 1 wherein the three phase input resonant network comprises:
   a plurality of AC voltage inputs;
   a plurality of input inductors operably connected to a respective AC voltage input; and
   a plurality of input capacitors operably connected to a respective input inductor.

3. The power conversion circuit of claim 2, wherein the input capacitors are also operably connected to a common terminal and the common terminal is operably connected to the secondary of the transformer to provide the alternate current path.

4. The power conversion circuit of claim 1, wherein the current source further comprises a first inductor operably connected to the switching circuitry and to the primary of the transformer, and wherein the primary of the transformer and the secondary of the transformer are operably connected to a common terminal.

5. The power conversion circuit of claim 4, further comprising:
   a pair of series connected output capacitors in parallel with the load;
   wherein the common terminal shared by the primary and secondary of the transformer is between the series connected output capacitors.

6. A method for reducing the current stress on the switching circuitry of a three-phase AC to DC voltage converter, comprising:
   inputting energy;
   storing energy in a first portion of the converter;
   discharging the energy stored in the first portion of the converter;
   operating switches in a second portion of the converter such that the discharged energy is conditioned; and bypassing the switches and transferring the discharged energy to a DC load via the bypass.

7. The method of claim 6, wherein the act of bypassing the switches comprises controllably, proportionally lowering current in the switches.

8. The method of claim 7, wherein the act of controllably lowering the current in the switches comprises selecting a current transformer ratio.

9. An AC-DC power converter, comprising:

an AC power source;

storage for storing the AC power;

a power factor correction stage, comprising:
- a pair of series connected switches, wherein the switches are connected at a switch terminal;
- a pair of series connected output capacitors, wherein the output capacitors are connected at an output capacitor terminal;
- a transformer having a primary with a first primary terminal and a second primary terminal and having a secondary with a first secondary terminal and a second secondary terminal;
- an inductor having a first inductor terminal and second inductor terminal, wherein the first inductor terminal is connected to the switch terminal and wherein the second inductor terminal is connected to the first primary terminal; and wherein the second primary terminal and the second secondary terminal are connected to the output capacitor terminal; and wherein the first secondary terminal is connected to the storage.

10. The power converter of claim 9, her comprising a rectifier having a plurality of diodes.

* * * * *

UNITED STATES PATENT AND TRADEMARK OFFICE
CERTIFICATE OF CORRECTION

PATENT NO.   : 6,239,995 B1  
DATED        : May 29, 2001  
INVENTOR(S)  : Weng et al.

Page 1 of 1

It is certified that error appears in the above-identified patent and that said Letters Patent is hereby corrected as shown below:

Column 7,
Line 16, reads "+5.1" should read -- =5.1 --

Column 12,
Line 15, reads "9, her" and should read -- 9, further --

Signed and Sealed this

Eighth Day of January, 2002

Attest:

Attesting Officer

JAMES E. ROGAN
Director of the United States Patent and Trademark Office